United States Patent
Moors et al.

(10) Patent No.: US 7,795,342 B2
(45) Date of Patent: Sep. 14, 2010

(54) EXTENDER FOR TREATMENT OF FIBER MATERIALS

(75) Inventors: Rolf Moors, Bonstetten (DE); Simpert Lüdemann, Bobingen (DE); Wilhelm Artner, Motzenhofen (DE); Andreas Eisele, Augsburg (DE); Edeltraud Schidek, Augsburg (DE); Heinz Gaugenrieder, Zusmarshausen (DE)

(73) Assignee: Huntsman International LLC, The Woodlands, TX (US)

( * ) Notice: Subject to any disclaimer, the term of this patent is extended or adjusted under 35 U.S.C. 154(b) by 895 days.

(21) Appl. No.: 10/563,201

(22) PCT Filed: Jul. 6, 2004

(86) PCT No.: PCT/EP2004/007347

§ 371 (c)(1),
(2), (4) Date: Jan. 3, 2006

(87) PCT Pub. No.: WO2005/005510

PCT Pub. Date: Jan. 20, 2005

(65) Prior Publication Data

US 2006/0155046 A1    Jul. 13, 2006

(30) Foreign Application Priority Data

Jul. 8, 2003    (EP) .................. 03015338

(51) Int. Cl.
*D06M 15/564*    (2006.01)
*D06M 15/277*    (2006.01)
*D06M 13/322*    (2006.01)
*C08G 18/00*    (2006.01)
*C08L 75/04*    (2006.01)

(52) U.S. Cl. ............ 524/507; 252/8.62; 252/8.63; 528/44; 528/59; 528/67; 525/455

(58) Field of Classification Search .......... 524/507
See application file for complete search history.

(56) References Cited

U.S. PATENT DOCUMENTS

| | | | |
|---|---|---|---|
| 3,968,066 A | | 7/1976 | Mueller ............... 260/29.2 |
| 4,054,592 A | | 10/1977 | Dear et al. ............... 560/25 |
| 4,834,764 A | | 5/1989 | Deiner et al. ........... 8/115.64 |
| 4,898,981 A | | 2/1990 | Falk et al. ............... 568/28 |
| 5,019,428 A | | 5/1991 | Lüdemann et al. ...... 427/387 |
| 5,214,121 A | | 5/1993 | Mosch et al. ............ 528/49 |
| 5,324,763 A | | 6/1994 | Rössler et al. .......... 524/368 |
| 5,508,370 A | | 4/1996 | Reiff et al. ............. 528/45 |
| 6,080,830 A | | 6/2000 | Dirschl et al. .......... 528/45 |
| 6,306,958 B1 | * | 10/2001 | Dirschl et al. ......... 524/805 |
| 6,387,999 B1 | * | 5/2002 | Dirschl et al. ......... 524/537 |
| 2002/0102382 A1 | | 8/2002 | Kwong et al. ........... 428/96 |
| 2003/0065088 A1 | | 4/2003 | Wamprecht et al. ...... 524/589 |

FOREIGN PATENT DOCUMENTS

| | | |
|---|---|---|
| EP | 0 325 918 | 8/1989 |
| EP | 0 348 350 | 12/1989 |
| EP | 0 459 125 | 12/1991 |
| EP | 0 491 248 | 6/1992 |
| EP | 0 537 578 | 10/1992 |
| EP | 0 872 503 | 10/1998 |
| WO | 86/02115 | 9/1985 |

* cited by examiner

*Primary Examiner*—Ling-Siu Choi
*Assistant Examiner*—Vu A Nguyen

(57) ABSTRACT

The use is described of aqueous dispersions in combination with fluoropolymers for oil- and water-repellent finishing of fiber materials. These dispersions have a long shelf life and contain a composition which is preparable by reaction of polyfunctional isocyanates with a deficiency of comparatively long-chain monohydric alcohols, subsequent reaction with a deficiency of a ketone oxime and final reaction with polyhydric alcohols or amino alcohols.

8 Claims, No Drawings

EXTENDER FOR TREATMENT OF FIBER MATERIALS

This invention relates to the use of an aqueous dispersion combined with a perfluoroalkyl-containing polymer to treat fiber materials. The aqueous dispersion comprises a composition which is preparable by successive reaction of polyfunctional isocyanates with monohydric alcohols, oximes and finally amines or polyhydric alcohols.

It is known to treat fiber materials, especially in the form of textile fabrics, with compositions which endow the fiber materials with oil- and water-repellent properties. Aqueous dispersions comprising polymers having perfluoroalkyl($R_F$) groups are used for this in particular. This is described inter alia in EP-A 491 248, U.S. Pat. No. 4,054,592, U.S. Pat. No. 3,968,066, EP-A 459 125, EP-A 348 350 and EP-A 325 918.

It is further known for $R_F$-polymers to be used combined with extenders. Extenders in many cases raise the oil-/water-repellent properties achieved compared with those achieved without extender. The use of extenders therefore frequently makes it possible to reduce the amount of costly $R_F$-polymers used.

The extenders used are in many cases derivatives of polyfunctional isocyanates, for example (poly)isocyanates reversibly blocked with ketone oximes. This is disclosed inter alia in WO 86/02115, EP-A 537 578 and EP-A 872 503.

The last reference mentioned discloses a process for preparing blocked isocyanates useful as extenders. Polyfunctional isocyanates are reacted with polyhydric short-chain alcohols to form compounds which still contain free NCO groups. They are subsequently reacted with hydroxyl-containing amines in such amounts that the products formed still contain free NCO groups. These are then reversibly blocked by reaction with blocking agents, for example ketone oximes. Although extenders prepared by this method have a number of advantageous properties, aqueous dispersions and aqueous textile-finishing liquors that comprise these extenders are not sufficiently storage-stable in certain cases. Products prepared using isocyanates are also described by US 2003/0065088 A1.

The present invention has for its object to develop compositions which are useful as an extender in the oil- and water-repellent finishing of fiber materials with polymers having perfluoroalkyl groups and which possess excellent storage stability in the form of aqueous dispersions, preferably even when the dispersions additionally comprise polymers having perfluoroalkyl groups.

This object is achieved by the use of an aqueous dispersion comprising a composition A combined with a polymer which comprises perfluoroalkyl groups to treat fiber materials, said composition A being preparable by the following successive steps of a) reacting a fluorine-free polyfunctional isocyanate having two or more NCO groups in the molecule or a mixture of such isocyanates with a fluorine-free monohydric alcohol having 10 to 24 and preferably 12 to 22 carbon atoms or a mixture of such alcohols by using 2 to 10 and preferably 4 to 8 equivalents of NCO groups per equivalent of OH groups of the alcohol, b) reacting the product obtained in step a) with a ketone oxime in such proportions that there are still free isocyanate groups present in the resultant product mixture, c) reacting the product mixture obtained in step b) with a fluorine-free organic amine which comprises two or three hydroxyl groups or with a fluorine-free polyhydric alcohol or with a mixture of such compounds in such proportions that the resultant product is free of isocyanate groups.

Aqueous dispersions which comprise such a composition A possess excellent stability after prolonged storage, even when they further comprise one or more dispersants. This applies at least in the overwhelming majority of cases even when polymers having perfluoroalkyl($R_F$) groups are additionally present in the dispersion. Such $R_F$-containing dispersions are very useful for the oil- and water-repellent finishing of fiber materials. Fiber materials which can be treated with such compositions are in particular textile fabrics in the form of wovens, knits or nonwovens. For these textile-finishing processes, which can be carried out according to known methods, for example in the form of padding, the high stability of the aqueous dispersions mentioned is of immense benefit not only with regard to the processing of the textiles but also with regard to the quality of the finished fabric. If, however, in some rare cases, depending on the choice of type and amount of the components, aqueous dispersions which comprise a composition A have good stability in prolonged storage only when there are no $R_F$-polymers in the dispersions, it is of advantage for an aqueous dispersion B which comprises a composition A but no $R_F$-polymer to be combined with an aqueous $R_F$-containing aqueous dispersion C only shortly before use in the textile-finishing operation. The combination of such a first aqueous dispersion B with such a second aqueous dispersion C is very useful for finishing textiles. The two dispersions can in most cases be combined by the manufacturer and need only be adjusted to the in-service (liquor) concentration at the textile-finishing facility. When an aqueous dispersion which comprises a composition A and an $R_F$-polymer possesses good stability in storage, however, it is in many cases also possible to prepare the dispersion by using the $R_F$-polymer not in the form of an aqueous dispersion but neat. This can be done for example by stirring the $R_F$-polymer into the aqueous suspension which comprises the composition A. This may be followed by mechanical homogenization, if appropriate.

The use of an aqueous dispersion of a composition A combined with a polymer which contains perfluoroalkyl groups ($R_F$-polymer) to treat fiber materials such as textiles for example leads to excellent oil- and water-repellent properties on the part of the finished fiber materials.

It has been determined that, when compositions A are used in the oil- and water-repellent finish, the ready-produced textiles can be endowed with a pleasantly soft hand.

A composition A can be prepared by the process steps indicated above and in claim 1. The stated order must be observed, namely first step a) then step b), then step c). The use of products where this order a), b), c) is not observed in their preparation is outside the present invention. When steps a), b) and c) are carried out in a different order than indicated above, appreciable disadvantages on the part of the products obtained may result. This applies particularly when step c) is carried out before step b) or step b) before step a).

Process Step a):

This step comprises reacting a fluorine-free polyfunctional isocyanate, i.e., a compound having 2 or more free NCO groups, or a mixture of such polyfunctional isocyanates with a fluorine-free monohydric alcohol or with a mixture of such alcohols. The fluorine-free monohydric alcohol possesses just one alcoholic hydroxyl group and comprises 10 to 24 and preferably 12 to 22 carbon atoms. The reaction as per process step a) shall employ 2 to 10 and preferably 4 to 8 equivalents of NCO groups on the polyfunctional isocyanate per equivalent of alcoholic OH groups on the alcohol. There is accordingly a deficiency of alcoholic OH groups, so that the resultant product will still comprise free NCO groups of which a portion are reversibly blocked by reaction with ketone oximes in process step b) as described hereinbelow.

Process step a), like the hereinbelow described process step c) produces through reaction of NCO groups with OH groups urethane bonds which are less reversible than the bonds between NCO groups and ketone oxime groups that are formed in step b).

Process step a) can be carried out according to known methods of urethane chemistry for reacting NCO groups with alcoholic OH groups. Depending on the nature of the starting substances used, the reaction temperature chosen can be in the range between room temperature and higher temperature, for example 100° C., but reaction temperatures of up to 150° C. are possible as well, if appropriate. It is frequently of advantage to perform process step a) in the presence of a catalyst or catalyst mixture. Suitable catalysts are alkoxides of metals. Titanium tetraalkoxides or tin tetraalkoxides such as $Ti(C_2H_5O)_4$ for example will prove particularly advantageous. If appropriate, trialkylamines, for example those having 6 to 12 carbon atoms in total, can be used as well, as cocatalysts. The catalyst need not be removed from the resultant product after process step a) has ended because its presence does not disrupt the subsequent process steps b) and c).

Although process step a) can be carried out without use of a solvent in a whole series of cases, it is preferable for it to be conducted in an organic solvent or solvent mixture. Useful solvents include organic compounds which do not react with NCO groups and alcoholic OH groups under the conditions of the reaction. Furthermore, the solvents should have boiling points of less than 200° C. and preferably less than 150° C. in order that their subsequent removal, for example by distillation, after step c) has been carried out is facilitated. Solvents which are very useful are dialkyl ketones such as methyl isobutyl ketone or carboxylic esters such as ethyl acetate. The solvents used shall be substantially free of water, i.e., comprise not more than small amounts of water in order that virtually no reaction of NCO groups with water may take place.

The solvent or solvent mixture used for process step a) need not be removed after step a). On the contrary, the subsequent process steps b) and c) can likewise be carried out in this unremoved solvent (mixture), if appropriate after addition of a further solvent. Only after step c) has been carried out and if appropriate only after aqueous dispersions which comprise the product obtained according to step c) have been prepared is it advantageous to remove the solvent (mixture).

The alcohols used in process step a) need to fulfill some conditions, which will now be described. When a mixture of alcohols is used for this step a), all these alcohols shall meet these conditions.

First, the alcohol is monohydric, i.e., it must not comprise more than one alcoholic OH group. It further comprises no fluorine atoms. It comprises 10 to 24, preferably 12 to 22 and more preferably 14 to 20 carbon atoms. It is preferable for the alcohol not to comprise any alicyclic or aromatic radicals. The process of the invention is very suitably performed using saturated or singly or multiply unsaturated alcohols, which may be branched or unbranched, or mixtures thereof. Examples of highly suitable alcohols are sterol alcohol, oleyl alcohol, cetyl alcohol. Good results are further obtained with the HD-Ocenol 70/75 V product from Henkel/Cognis of Germany.

The second starting material for performing process step a) is a polyfunctional isocyanate which comprises 2 or more NCO groups in free form. The isocyanate further comprises no fluorine atoms. A mixture of isocyanates can be used instead of a single isocyanate. All isocyanates present in the mixture need to meet the abovementioned conditions, however.

The isocyanates used are preferably diisocyanates or triisocyanates or mixtures thereof, i.e., products having 2 or 3 NCO groups in the molecule. Otherwise the isocyanates need not fulfill any specific requirements. Aliphatic, acyclic or alicyclic isocyanates can be used. Similarly, polyfunctional isocyanates which comprise aromatic groups are highly suitable. Examples of suitable isocyanates are to be found in US Patent Application No. 2002/0102382 A1 (paras 0011, 0012, 0013 and 0014 on pages 1 and 2).

Tolylene diisocyanate (pure isomers or isomeric mixture) is particularly useful for the process leading to compositions A, as are polymers which still comprise on average at least 2 free NCO groups in the molecule. Step a) of the process is accordingly more preferably carried out using a polymeric isocyanate which is obtainable by reaction of a tolylene diisocyanate with 1,1,1-trimethylolpropane and diethylene glycol and which still comprises on average 2 or more NCO groups in the molecule. Such a product is commercially obtainable under the designation "DESMODUR® L 75" (from Bayer of Germany). Another highly suitable isocyanate is the "DDI 1410-Diisocyanat" product from Cognis of USA, a cyclohexane which is substituted by a plurality of alkyl radicals of which 2 each have a terminal NCO group.

Further suitable polyfunctional isocyanates are available, from Degussa-Hüls of Germany, in the form of the VESTANAT® range, for example VESTANAT IPDI, VESTANAT TMDI and VESTANAT B 370.

Particularly good results are obtained in the process in a preferred embodiment which is characterized in that step a) utilizes a mixture of isocyanates wherein one of these isocyanates is an alicyclic isocyanate.

This mixture can consist for example of a polymeric isocyanate, for example of the abovementioned kind, and of an alicyclic isocyanate, in which case the alicyclic isocyanate can be a substituted cyclohexane of the kind described above. Both types of isocyanates still need to have at least 2 free NCO groups per molecule, of course. Preferably, the polymeric isocyanate forms the main constituent of the NCO mixture, namely about 80-95% by weight, whereas the alicyclic isocyanate is preferably present at 5-20% by weight. It has been determined that the use of such a mixture is able to endow the resulting compositions A, especially in the form of aqueous dispersions, with a further enhanced storage stability as compared with the use of just the polymeric isocyanates alone.

Process Step b):

As mentioned above, this step, like the hereinbelow described step c), can likewise be carried out in the presence of a solvent and/or catalyst. The reaction temperature can be between room temperature and 90° C. depending on the products used and preferably it is in the range from 45° C. to 85° C. As for the rest suitable reaction conditions for process step b) are known from the literature on the reversible blocking of isocyanate groups with ketone oximes.

Process step b) comprises the product (mixture) obtained according to step a), which still contains free isocyanate groups, being reacted with a ketone oxime. A deficiency of oxime groups relative to free NCO groups is used, so that the product (mixture) obtained according to step b) in turn still contains free isocyanate groups. The reaction is preferably carried out such that process step b) utilizes 0.2 to 0.7 and preferably 0.35 to 0.65 equivalent of oxime groups per equivalent of free isocyanate groups still present. The reaction as per process step b) leads to a portion of the NCO groups present being reversibly blocked. This blocking in the form of a bond between oxime groups and NCO groups is reversible under the conditions of subsequent textile finishing, so that NCO groups are back-formed in the course of the customary treatment of textile fabrics and are then available for reaction with reactive groups on the fiber material, for example OH groups on cellulosic fibers.

Suitable ketone oximes are commercially available or preparable in a conventional manner from the corresponding ketones by reaction with hydroxylamine.

Suitable ketone oximes are the oximes of all ketones which do not contain additional groups capable of reacting with NCO groups, preferably of ketones of the formula R—CO—R', where R and R' are independently unsubstituted hydrocarbyl radicals having 1 to 12 carbon atoms. R and R' may be purely aliphatic, aromatic or araliphatic radicals. Particularly good results are obtained with compositions A when not only R but also R' are aliphatic, acyclic radicals having 1 to 8 carbon atoms. Butanone oxime(methyl ethyl ketone oxime) or methyl isobutyl ketone oxime are very useful, for example.

Process Step c):

The product (mixture) obtained according to process step b) still contains free isocyanate groups. These are reacted with a fluorine-free organic amine which contains two or three hydroxyl groups or a fluorine-free polyhydric alcohol or a mixture of such compounds in step c). The products mentioned are used in such amounts that the product (mixture) obtained according to step c) is free or substantially free of isocyanate groups, i.e., NCO groups on the one hand and alcoholic OH groups on the other are used in fractions which are approximately equivalent to each other. The absence of NCO groups can be determined by IR spectroscopy in a simple and known manner. Amines which are very useful for the reaction with the free isocyanate groups as per process step c) are amines which contain one, but preferably two or three, organic radicals attached to a nitrogen atom. These radicals have to have in total two or three OH groups as substituents. Preferably, the nitrogen atom has attached to it two or three aliphatic radicals R which each have 2 to 6 carbon atoms and of which each comprises a hydroxyl group, preferably a terminal hydroxyl group. When only two such radicals are attached to the nitrogen atom, the third substituent on the nitrogen may be a hydrogen atom or an unsubstituted alkyl group having 1 to 4 carbon atoms. Preferably, this third substituent is hydrogen or a methyl group.

The radicals attached to the nitrogen atom may contain further hetero atoms such as oxygen, nitrogen or silicon.

Particularly good results are obtained when the amine utilized in step c) is N-methyldl-ethanolamine or triethanolamine or a mixture thereof.

When process step c) utilizes a polyhydric alcohol instead of an amine, preferred alcohols have two or three alcoholic OH groups. It is possible to use aromatic polyhydric alcohols or to be more precise phenols, for example dihydroxybenzenes or trihydroxybenzenes. However, preference is given to using aliphatic alicyclic diols or triols having 2 to 8 carbon atoms, for example ethylene glycol, diethylene glycol, 1,2- or 1,3-propylene glycol, or mixtures which comprise a plurality of such alcohols, or mixtures which comprise one or more such alcohols and one or more of the abovementioned amines.

The compositions A obtained according to process steps a) to c) are particularly useful as an extender in the oil- and water-repellent finishing of textile fabrics with polymers which contain perfluoroalkyl($R_F$) groups. These finishes are performed using aqueous dispersions which comprise a composition A. The aqueous dispersions preferably further comprise one or more dispersants. It is particularly advantageous for at least one of the dispersants used to be cationic.

Dispersants which are highly suitable are known nonionic surface-active products such as ethoxylated fatty alcohols or ethoxylated fatty acids, especially in combination with cationic surfactants. Quaternary ammonium salts in particular are useful as cationic dispersants. These can be used alone or in combination with the abovementioned nonionic dispersants. Examples of suitable commercial cationic dispersants are the well-known tetraalkylammonium chlorides wherein at least one of the 4 alkyl radicals contains more than 10 carbon atoms, or tetraorganoammonium chlorides which, as well as at least one relatively long-chain alkyl radical, contain one or more polyoxyethylene radicals attached to nitrogen.

Aqueous dispersions of compositions A are suitably prepared using methods well known to one skilled in the art. For example, an aqueous solution of the dispersant or dispersant mixture is prepared and the composition A is stirred into this solution, if appropriate at elevated temperature. This may be followed by mechanical homogenization, if required. When the composition A used for this contains organic solvent, it is advantageous in many cases not to remove this organic solvent until after the aqueous dispersion has been prepared, especially when the solvent-free composition A is difficult to handle on account of excessive viscosity. The aqueous dispersions of compositions A preferably comprise 5 to 50% by weight of composition A as obtained after performance of process step c) and 2 to 10% by weight of dispersant or dispersant mixture. These values relate to dispersions from which any organic solvent present has previously been removed, for example by distillation.

There are a whole series of cases where it is advantageous to add an acid to the aqueous dispersions in order that the pH may be adjusted to a value in the acidic range, for example in the range from 1.5 to 5. Suitable acids for this purpose are inorganic acids such as hydrochloric acid, sulfuric acid or phosphoric acid, or low molecular weight carboxylic acids such as acetic acid. By adjusting the pH to a value in the acidic range, from about 3-5.5, the compositions A can be converted into a water-soluble or self-emulsifying form in a whole series of cases, so that the use of dispersants can then be dispensed with entirely.

As mentioned, aqueous dispersions which comprise a composition A are combined with polymers comprising perfluoroalkyl groups and advantageously used for the oil- and water-repellent finishing of fiber materials. The compositions A act as an extender in these combinations. The fiber materials are preferably textile fabrics in the form of wovens, formed-loop knits or nonwovens and can for example consist of cellulosic fibers, cotton for example, polyester, polyamide or fiber blends. They primarily serve to produce finished articles in which oil- and/or water-repellent properties are desired, such as for example weather-proof apparel, awnings, tablecloths, furniture coverings, tent canvas, etc.

The textiles can be finished according to processes known to one skilled in the art, for example via padding at customary liquor concentrations and subsequent drying. If appropriate, this is followed by a cure according to customary methods at higher temperatures.

Aqueous dispersions which comprise compositions A may be combined with polymers comprising $R_F$ groups according to a plurality of methods:

a) An aqueous dispersion of a composition A is prepared as described above, any organic solvent present is removed by distillation and the resultant dispersion has the fluorine-containing polymer added to it neat. However, this method is less preferred and in fact only sensible when the polymer is liquid and not highly viscous.

b) Like a) except that the fluorine-containing polymer($R_F$-polymer) is not added neat, but is added in the form of an aqueous dispersion or in the form of a solution in an organic solvent or solvent mixture.

Method a) or b) may be followed if appropriate by mechanical homogenization and, if appropriate, removal of organic solvent.

The aqueous dispersions thus prepared preferably comprise 1 to 4 parts by weight of the polymer having perfluoroalkyl groups per part by weight of composition A. These values relate to compositions A as obtained according to process step c), i.e., to water- and solvent-free compositions A, and to perfluoroalkyl($R_F$)-containing polymers as such, i.e., likewise water- and solvent-free products.

The aqueous dispersions mentioned preferably comprise 40% to 80% by weight of water, the sum total of composition A and fluoropolymer (both reckoned as water- and solvent-free products) is preferably 15% to 55% by weight. In addition, as mentioned, the aqueous dispersions preferably comprise one or more dispersants. To achieve specific effects, they may additionally comprise further products such as silicones as softeners, flame retardants or cellulose crosslinkers. In this case, the percentages of fluoropolymer and composition A can be somewhat lower than the ranges indicated above as preferred.

The perfluoroalkyl-containing polymers which may be used for textile finishing in combination with compositions A are known to one skilled in the art. A whole series of such polymers is commercially available in the form of aqueous dispersions, for example the OLEOPHOBOL® products from Ciba Spezialitätenchemie Pfersee GmbH of Germany or the ZONYL® products from DuPont.

The polymers which contain perfluoroalkyl($R_F$) radicals are polymers which contain one or more perfluoroalkyl($R_F$) radicals in the molecule. The $R_F$ radicals are preferably linear monovalent radicals of formula

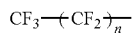

where n is on average from 3 to 23 and preferably from 7 to 19. The value of n can differ for the individual molecules of the polymer, so that the polymer used will normally be a mixture of compounds which differ not only in the degree of polymerization but also in the chain length of the perfluoroalkyl radical $R_F$. Particularly suitable polyacrylates or polymethacrylates which contain $R_F$ groups are derived from monomers of the formula

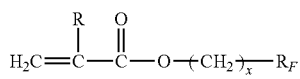

where R is H or $CH_3$ and
x is a number from 2 to 6 and preferably is 2.

A further group of preferred $R_F$-containing polymers are polyurethanes which are obtainable by reaction of polyfunctional isocyanates, preferably diisocyanates, with $R_F$-containing polyhydric alcohols, preferably diols. Suitable perfluoroalkyl-containing polymers and their preparation are further described in U.S. Pat. No. 4,054,592, U.S. Pat. No. 3,968,066, EP-A 348 350, EP-A 459 125, EP-A 537 578 and EP-A 325 918.

The examples which follow illustrate the invention.

Deficiency in the examples which follow refers to an equivalent deficiency compared with free NCO groups present.

EXAMPLE 1

Inventive a) Preparation of a Composition A
450 g of a polymeric polyisocyanate
(DESMODUR L75, as described above)

and 60 g of an alicyclic diisocyanate
(DDI 1410-Diisocyanat, as described above)

were dissolved in
520 g of methyl isobutyl ketone
at 60° C. by stirring.
A deficiency of
HD-Ocenol 70/75 V
(mixture of cetyl alcohol and oleyl alcohol that has an iodine number of 70-75)

and 10 ml of a 10% solution of $Ti(C_2H_5O)_4$ in methyl isobutyl ketone and 1 ml of a 10% solution of triethylamine in methyl isobutyl ketone were added and stirred in for 1 hour at about 60° C.
A deficiency of
methyl ethyl ketone oxime(butanone oxime)
was then added at this temperature and stirred in at 75° C. for 75 minutes.

Finally, a solution of
N-methyldiethanolamine in
23 g of methyl isobutyl ketone
was added and stirred in for 1 hour at about 85° C.
The amount of N-methyldiethanolamine used had been determined such that it was approximately equivalent to the amount of free NCO groups still present.

The product obtained no longer showed an NCO signal in the IR spectrum.

26 g of Silikon ÖIL 080 (from Wacker of Germany) were added. The product mixture thus obtained will hereinafter be referred to as "mixture 1".

b) Preparation of an Aqueous Dispersion of Mixture 1
1280 g of mixture 1 were dispersed in an aqueous solution at 30° C. by thorough, mechanical homogenization.
This aqueous solution contains
1650 g of water,
67 g of a mixture of nonionic and cationic dispersants and 110 g of propylene glycol.
Adjustment of the pH to a value of about 3 with hydrochloric acid and further mechanical homogenization provided a slightly viscous dispersion from which the methyl isobutyl ketone present was distilled under a reduced pressure. The result was a stable dispersion which was free of deposits after prolonged storage. Before the finishing trials described hereinbelow were carried out, the dispersion was additionally admixed with 200 g of water and 73 g of a dispersant (reaction product of diglycidyl ether with aliphatic diamine).

EXAMPLE 2

Inventive a) Preparation of a Composition A 112 g of DESMODUR L75

15 g of DDI 1410-Diisocyanat were dissolved at room temperature in 130 g of methyl isobutyl ketone.

A deficiency of octadecyl alcohol was then added and stirred in for 90 minutes at about 85° C. This was followed by the addition of a deficiency of butanone oxime followed by stirring at about 75° C. for 10 minutes.

Then a solution of

N-methyldiethanolamine in 12 g of methyl isobutyl ketone was added and stirred in at 65° C. for 180 minutes. The mixture was left to stand overnight and then stirred once more for 80 minutes. Examination by IR spectroscopy showed the NCO signal to be absent.

This is followed by the addition of 6.5 g of Silikonöl (as in example 1). The mixture obtained will hereinafter be referred to as "mixture 2".

b) Preparation of an Aqueous Dispersion of a Composition A 155 g of mixture 2 were dispersed in an aqueous solution. This aqueous solution contained 315 g of water 16.5 g of dispersant mixture (as in example 1)

27 g of propylene glycol.

Dispersion was accomplished by mechanical homogenization at 30° C. A pH of about 4.5 was then set by addition of acetic acid. The result was a dispersion from which the methyl isobutyl ketone present was removed by distillation under reduced pressure. The resulting aqueous dispersion was of good quality and possessed good stability after prolonged storage. This dispersion was additionally admixed with 130 g of water and 16 g of the dispersant based on diglycidyl ether (see example 1).

EXAMPLE 3

Inventive

Finishing Trials

About 2 parts by weight each of the dispersions obtained as per examples 1 and 2 were each combined with about 4 to 5 parts by weight of an aqueous dispersion which contained about 25% by weight of a polymer having perfluoroalkyl groups (OLEOPHOBOL=$R_F$-polyacrylate from Ciba Spezialitätenchemie Pfersee GmbH of Germany or, in another trial, ZONYL from DuPont, likewise an $R_F$-polyacrylate).

The dispersions thus obtained were used to prepare padding liquors having customary concentrations, and woven textile fabrics were finished with these and dried. The finished wovens exhibited a pleasantly soft hand and very good water- and oil-repellent properties.

EXAMPLE 4

Comparative, not Inventive

This example omitted process step b) of claim 1 (blocking with ketone oxime).

112 g of DESMODUR L75

15 g of DDI-1410-Diisocyanat were dissolved at 60° C. in 130 g of methyl isobutyl ketone.

A deficiency of

HD-Ocenol 70/75

(mixture of cetyl and oleyl alcohol) and 1.5 ml of a 10% solution of Ti($C_2H_5O$)$_4$ in methyl isobutyl ketone 0.25 ml of a 10% solution of triethylamine in methyl isobutyl ketone were then added and the mixture was stirred at 60° C. for 1 hour.

Following addition of a solution of 5 g of N-methyldiethanolamine in 12 g of methyl isobutyl ketone the batch was stirred at 60° C. for 45 minutes.

The result was a product of rubbery consistency, which was unsuitable for further processing (dispersion in water). Since the product thus was no longer available for blocking with ketone oxime either, this example is evidence that the order of process steps a), b), c) has to be observed.

EXAMPLE 5

Comparative, not Inventive

This example was carried out with neither a process step a) (reaction with monoalcohol) nor a process step b) (blocking with ketone oxime).

112 g of DESMODUR L75

15 g of DDI-1410-Diisocyanat were dissolved at 60° C. in 130 g of methyl isobutyl ketone This was followed by the addition of 4.8 g of N-methyldiethanolamine dissolved in 12 g of methyl isobutyl ketone and 1.5 ml of Ti($C_2H_5O$)$_4$ solution as in example 4

0.25 ml of N($C_2H_5$)$_3$ solution as in example 4 and the mixture was stirred at 60° C. for 100 minutes. Following storage for 15 hours the product obtained had a rubbery consistency and was unsuitable for any further processing.

What is claimed is:

1. A method of treating fiber materials which comprises applying an aqueous dispersion comprising a composition A combined with a polymer which comprises perfluoroalkyl groups thereto, said composition A being prepared by the following successive steps of:

a) reacting a fluorine-free polyfunctional isocyanate mixture comprising about 80-95% by weight of a polymeric isocyanate and about 5-20% by weight of an alicyclic isocyanate and wherein each type of isocyanate has at least two free NCO groups per isocyanate molecule with a fluorine-free monohydric alcohol having 10 to 24 carbon atoms or a mixture of such alcohols by using 2 to 10 equivalents of NCO groups per equivalent of OH groups of the alcohol;

b) reacting the product obtained in step a) with a ketone oxime in such proportions that there are still free isocyanate groups present in the resultant product mixture; and c) reacting the product mixture obtained in step b) with a fluorine-free organic amine which comprises two or three hydroxyl groups or with a fluorine-free polyhydric alcohol or with a mixture of such compounds in such proportions that the resultant product is free of isocyanate groups.

2. The method according to claim 1, wherein one or more of said steps a), b) and c) are carried out in an anhydrous solvent.

3. The method according to claim 1, wherein step a) utilizes a polymeric isocyanate which is obtained by reaction of a tolylene diisocyanate with 1,1,1-trimethylolpropane and diethylene glycol and which still comprises on Average2 or more NCO groups in the molecule.

4. The method according to claim 1, wherein step b) utilizes 0.2 to 0.7 equivalent of oxime groups per equivalent of free isocyanate groups still present.

5. The method according to claim 1, wherein the amine utilized instep c) is N-methyldiethanolamine or triethanolamine or a mixture thereof.

6. The method according to claim 1, wherein the aqueous dispersion comprises one or more dispersants.

7. The method according to claim 1, wherein the aqueous dispersion comprises at least one cationic dispersant.

8. The method according to claim 1, wherein the fiber materials are textile fabrics in the form of wovens, formed-loop knits or nonwovens.

* * * * *